Nov. 21, 1939.   D. E. WHITE   2,180,650
METHOD OF MAKING A NONSKID TIRE
Filed July 20, 1938
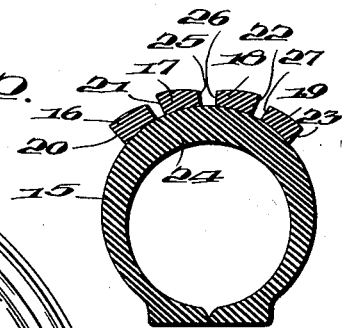
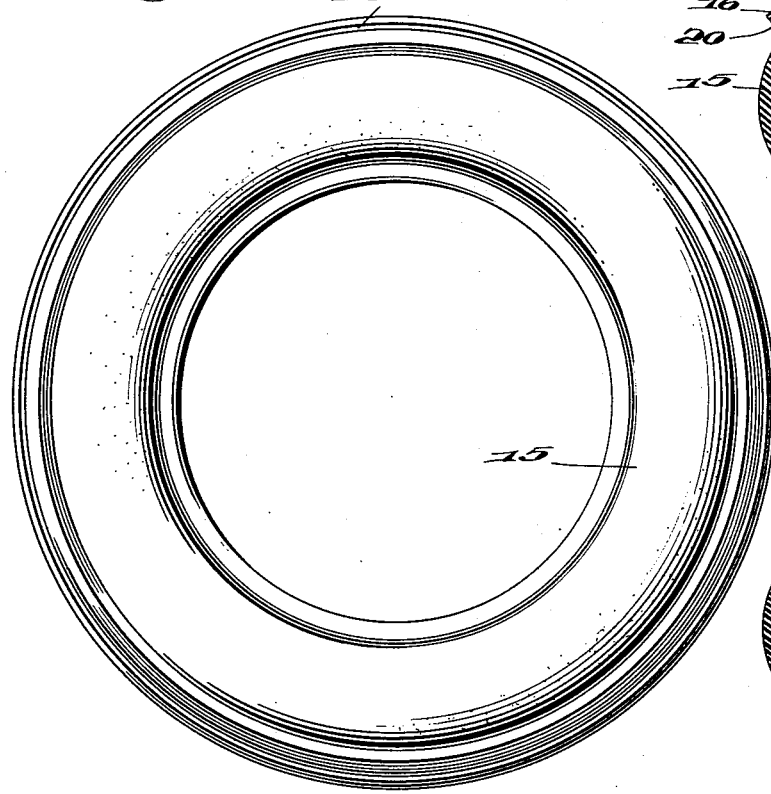
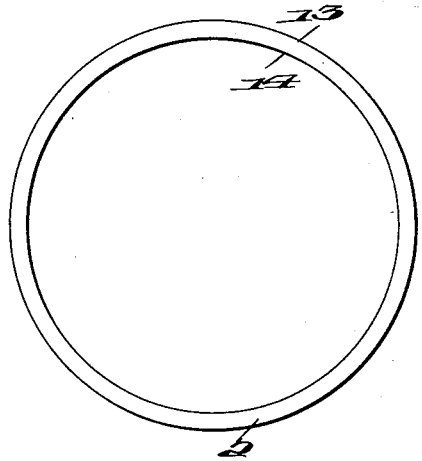
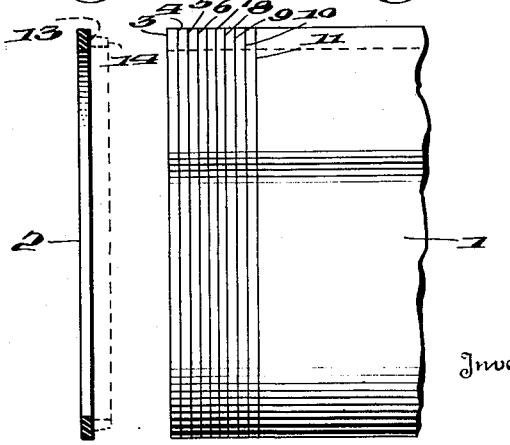
Inventor
David E. White,
By Mason & Mason
Attorneys Patented Nov. 21, 1939

2,180,650

UNITED STATES PATENT OFFICE 2,180,650

METHOD OF MAKING A NONSKID TIRE

David E. White, Silver Spring, Md.

Application July 20, 1938, Serial No. 220,354

11 Claims. (Cl. 154—14)

The present invention concerns itself with a method of forming and attaching a plurality of ribs to the peripheral surface of a tire part or to a tire which may be new or a tire that has been subjected to use, and the principal object of the invention is to provide a method of making a tire tread surface composed of ribs of rubber, each rib comprising portions which are under different tension than other portions of the same rib.

The above object is attained by f into rings or ribs, having m diametered portions, that another step of the proc walls of the rib which is later casing.

A tire thus obtained possesses tread surfaces formed of said ribs which possess superior wearing qualities and skid-resisting qualities.

Other objects will appear hereinafter throughout the specification.

In the drawing:

Figure 1 is a side elevational view of one form of nonskid tire;

Figure 2 is a cross sectional view of the tire shown in Figure 1;

Figure 3 is a side elevational view of one of the ribs as cut from a rubber cylinder;

Figure 4 is a cross-sectional view of the ribs shown in Figure 3, there being shown in dotted lines the deformation of said ring before application to a tire casing;

Figure 5 is an elevation of a rubber cylinder showing how the cuts are made to separate several rings from said cylinder; and Figure 6 is a cross-sectional view similar to Figure 2 of another type of tire showing two ribs instead of the four rib construction shown in Figure 2.

Figure 5 shows a portion of a rubber cylinder indicated by the numeral 1, from which the rubber rings, which later comprise the tire ribs, are formed. Figure 4 discloses a section, and Figure 3 a side elevation of a ring 2, that has been sliced from one side of the rubber cylinder, and the numerals 3, 4, 5, 6, 7, 8, 9, 10, and 11, indicate the line of cut from which other rubber rings are produced.

Preferably, said rings are made by first sliding the cylinder or sleeve 1 of rubber over a cylindrical form (not shown) of approximately the same diameter or of slightly greater diameter than the interior diameter of the rubber sleeve 1. The interior diameter of said sleeve is, of course, of the same diameter as the inner cylindrical surface of the ring 2.

Before the rings are applied to the peripheral portion of the tire casing, each ring is turned on its side, as shown in dotted lines in Figure 4, applied and permanently affixed to the peripheral surface of a tire casing 15. Preferably several rings are mounted on the peripheral tire surface in such a manner that the tensioned portions of one rib are opposed to the untensioned or substantially untensioned portions of another rib, which lies parallel and closely adjacent thereto. Said ribs may be applied to the tire casing by any of the usual methods, such as vulcanization, cementing, riveting, etc.

In the event the vulcanizing step is made use of, caution should be used to prevent the flowing of the rubber of the rib. This may be accomplished, for example, by subjecting the casing to a much greater degree of heat than the ribs. The ribs may even be applied cold to a tire casing, the outer peripheral surface of which has been subjected to such temperature as will cause the rubber of the casing to flow or to become plastic.

Referring to Figure 2, it will be seen that the ribs 16, 17, 18, and 19 are provided with side edges 20, 21, 22 and 23. These side edges originally formed the outer peripheral surface 13 of the ring, and the opposite side edges 24, 25, 26 and 27 previously formed the interior peripheral portions of said such rings or ribs.

In the form shown in Figure 2, the outside periphery of the tire is curved in cross-section. In the form shown in Figure 6, the tire 15 is provided with a flattened portion 30 on which the rings 28 and 29 have been permanently affixed by vulcanizing, cementing, etc. The rings 28 and 29 will be under a different (probably greater) degree of tension than rings 16, 17, 18 and 19, due to the fact that they have been twisted to a greater degree than said last mentioned ribs.

It will therefore be apparent to those skilled in the art that by using the method of the present invention, for forming tires, ribs may be formed having side edges or circumferential areas that are either under a minimum tension or under no tension, and that each of said ribs have other circumferential areas which are under a considerable amount of tension. It will be apparent to those skilled in the art that if a sharp knife were drawn transversely across rib 16, for example, from right to left, the area of greatest tension would be severed first, and that the tension of the rubber gradually and uniformly decreased as the blade moved to the left in the cutting operation.

The ribs of said tire may extend circumferentially of the tire as shown in Figs. 1 and 2, or transversely, or even diagonally, as stated in my copending application Serial No. 220,353, filed July 20, 1938. Said ribs may be applied either directly to the peripheral surface of the tire or to a base of suitable material, such as rubber, which may be later vulcanized or otherwise attached to a tire casing.

A tire constructed in accordance with the above described method possesses superior road gripping and braking qualities. Such a tire also possesses non-rumbling qualities and is a nonskidding tire.

I claim:

1. The method of forming a tire rib, which consists in slicing a ring from a rubber cylinder, turning said ring on its side to provide a tire rib having sides under unequal tension, and attaching said ring to the periphery of a tire part.

2. The method of forming a tire which consists in cutting a plurality of rings of substantially the same size from a cylinder of rubber, then turning said rings on their sides so that opposite sides are under unequal tension, and attaching said rings to a tire.

3. The method of forming a tire which consists in cutting a plurality of rings of substantially the same size from a cylinder of rubber, then turning said rings on their sides so that opposite sides are under unequal tension, and attaching said rings to the periphery of a tire.

4. The method of forming a tire which consists in forming a plurality of rings of rubber, each ring having an inside diameter and an outside diameter of greater length than said inside diameter, and turning each of said rings on its side so that one side is under greater tension than the other side and subsequently attaching said rings in spaced relation to the periphery of a tire casing.

5. The process of constructing a tire that comprises cutting a plurality of rubber rings of substantially the same shape and having parallel sides from a hollow rubber cylinder, then turning each of said rings on its side, whereby inside and outside diameter portions form the sides of said rings, and permanently attaching said ribs to a portion of a tire so that said ribs form the friction surface of said tire.

6. A method of manufacturing a tire which consists in cutting a plurality of rubber rings to form substantially uniform parallel sides from a rubber sleeve, turning each of said rings on its side so that one side is under greater tension than the opposite side, and finally affixing said rings in spaced parallel relation to the outer periphery of a tire casing.

7. A method of manufacturing a semi-solid tire which consists in slicing from a cylindrical rubber body a plurality of rings of substantially equal cross-sectional area, turning each of said rings in such position that the interior and exterior cylindrical portions thereof become side portions of the completed ring and attaching said rings to the exterior surface of a tire casing.

8. The method of manufacturing a tire tread surface which comprises turning a plurality of rubber rings having exterior and interior cylindrical surfaces, on their sides to form ribs having an inside diameter less than the diameter of said tire and attaching said rings in their last-named position to the outside periphery of a tire casing.

9. The method of forming a tread for a tire which consists in cutting a plurality of rings from a rubber cylinder, turning each of said rings on its side to cause portions of the same to be stretched and to cause other portions to be untensioned, and to thereafter apply said tire ribs to a tire part.

10. The method of forming a tread for a tire which consists in turning a rubber ring on its side to cause portions of the same to be under comparatively high tension, and to cause other portions to be under less tension than said first-named portions, and thereafter permanently attaching both the high tensioned portions and the less tensioned portions to a tire casing.

11. The method of forming a tread for a tire which consists in cutting a plurality of rings from a rubber cylinder, turning at least one of said rings on its side by twisting said ring in one direction to cause portions of the same to be stretched, turning at least one other of said rings on its side by twisting said ring in the opposite direction from said ring first named to cause portions of the same to be stretched and thereafter attaching said rings in their stretched positions to a tire part.

DAVID E. WHITE.